(12) United States Patent
Williams

(10) Patent No.: US 7,534,830 B2
(45) Date of Patent: May 19, 2009

(54) AQUEOUS DISPERSIONS OF POLYURETHANE-ADDITION POLYMER HYBRID PARTICLES ESPECIALLY FOR USE IN COATING COMPOSITIONS

(75) Inventor: Neal Williams, Warfield (GB)

(73) Assignee: Imperial Chemical Industries, London (GB)

( * ) Notice: Subject to any disclaimer, the term of this patent is extended or adjusted under 35 U.S.C. 154(b) by 0 days.

(21) Appl. No.: 11/148,719

(22) Filed: Jun. 9, 2005

(65) Prior Publication Data

US 2005/0256252 A1 Nov. 17, 2005

(51) Int. Cl.
*C08J 3/00* (2006.01)
*C08L 83/04* (2006.01)
*C08L 31/00* (2006.01)

(52) U.S. Cl. ................. 524/507; 524/589; 524/832
(58) Field of Classification Search ............... 524/507, 524/589, 832
See application file for complete search history.

(56) References Cited

U.S. PATENT DOCUMENTS

| | | | |
|---|---|---|---|
| 4,198,330 A | 4/1980 | Kaizerman et al. | |
| 4,269,784 A | 5/1981 | Doyle | |
| 4,883,854 A | 11/1989 | Coury et al. | |
| 5,173,526 A * | 12/1992 | Vijayendran et al. | 524/457 |
| 5,814,144 A | 9/1998 | Coutts et al. | |
| 5,827,931 A | 10/1998 | Menovcik et al. | |
| 6,248,415 B1 | 6/2001 | Pedain et al. | |
| 6,579,932 B1 | 6/2003 | Schipper et al. | |
| 6,911,487 B2 * | 6/2005 | Erdem et al. | 523/201 |
| 2002/0177654 A1 * | 11/2002 | Erdem et al. | 524/801 |

FOREIGN PATENT DOCUMENTS

| | | | |
|---|---|---|---|
| EP | 0510572 A2 | | 10/1992 |
| EP | 510572 A2 * | | 10/1992 |
| EP | 0 647 662 A | | 4/1995 |
| EP | 1129146 B1 | | 7/2002 |
| GB | 1584865 | * | 2/1981 |
| GB | 1584865 A | * | 2/1981 |
| JP | 08 012642 A | | 1/1996 |
| WO | WO 99/67312 | | 12/1999 |
| WO | WO 01/48106 | | 7/2001 |
| WO | WO 02/055576 A2 | | 7/2002 |
| WO | WO 02055576 A2 * | | 7/2002 |
| WO | WO 03/054093 A2 | | 7/2003 |

OTHER PUBLICATIONS

J.W. Rosthauser and K. Nachtkamp, titled "Waterborne Polyurethanes" in Advances in Urethane Science and Technology, vol. 10, pub 1987 and edited by K.C. Frisch & D. Klempner.
Polyurethane Chemistry and Technology, Part 1: Chemistry, pp. 173-177, published by Interscience Publishers, 1962.

* cited by examiner

Primary Examiner—Ling-Siu Choi
Assistant Examiner—Michael M Bernshteyn
(74) Attorney, Agent, or Firm—George W. Moxon, II; Roetzel & Andress

(57) ABSTRACT

An aqueous dispersion of polyurethane-addition polymer hybrid particles, where the isocyanates used to make the polyurethane polymer portion of the particles comprise a mixture of aromatic polyisocyanate and aliphatic polyisocyanate wherein the aromatic isocyanate is free of sterically hindered isocyanate moieties. The dispersions are suitable for use in coatings, including varnishes, paints, inks and adhesives.

26 Claims, No Drawings

AQUEOUS DISPERSIONS OF POLYURETHANE-ADDITION POLYMER HYBRID PARTICLES ESPECIALLY FOR USE IN COATING COMPOSITIONS

This application claims priority under 35 U.S.C. §120 based on International Patent Application No. PCT/EP/2003/013078 filed Nov. 19, 2003 entitled "AQUEOUS DISPERSIONS OF POLYURETHANE-ADDITION POLYMER HYBRID PARTICLES ESPECIALLY FOR USE IN COATING COMPOSITIONS" and now published with the International Publication No. WO 2004/055086 and this application claims the right of priority under 35 U.S.C. §119 based on Great Britain Patent Application No. 0229339.7 filed Dec. 17, 2002. The disclosure of all of these applications is hereby incorporated by reference.

This invention relates to aqueous dispersions of polyurethane-addition polymer hybrid particles where the polyurethane portion is derived from polyisocyanate mixtures containing aromatic polyisocyanate, free of sterically hindered isocyanate moieties, and aliphatic polyisocyanate especially where the dispersions are substantially free of large particles. The invention also relates to a process for making such dispersions which leaves the interior surfaces of the reaction vessel substantially free of polymer residue. It further relates to aqueous coating compositions, especially inks, adhesives and paint coatings, including lacquers, varnishes and woodstains containing the dispersions.

Paint coating compositions are surface protective and/or decorative coatings which when applied to substrates and allowed to dry and/or cure form continuous films which protect and/or decorate the substrate. The substrates vary widely and include metals, wood, plastics and plaster. In some applications it is desirable for the paint to crosslink or cure in order to provide the necessary protective properties. Industrial paint coating compositions such as those used in coating metal containers or motor vehicles are usually crosslinkable as this enables the final properties of the dried film to develop rapidly.

Paint coating compositions contain a binder and optionally other materials such as pigments, extenders and flow aids. The binder holds together the other materials in the dried and/or cured coating and bonds the coating to the substrate. The nature of the polymeric binder is a major factor in determining the properties of the dry, solid paint coating. This is especially so when the paint dries exclusively by solvent loss without crosslinking or curing. Important properties include the hardness of the film and its resistance to water. Of particular importance is the ability of the paint coating to resist damage when exposed to water and aqueous solutions of bleach. Inadequate resistance to bleach in particular can cause the paint coating to be irreparably damaged and means that the paint cannot be used in environments where bleach may be commonly found, such as kitchens and bathrooms.

Nowadays aqueous binders are preferred for environmental reasons and many types are suitable for formulating aqueous coating compositions. Broadly, they may be divided into two categories; namely solution polymers and dispersion polymers. The solution polymers are so named because the polymers are dissolved in an aqueous medium being substantially (ie at least 50% by weight) water. A disadvantage of these polymers is that the resulting binder solution is high in viscosity and consequently coatings or adhesives formulated from them usually have to be low in solids content in order to be conveniently applied to the substrate. Furthermore, the water solubility of such binders results in the final dried coating being poor in its water resistance even when crosslinked.

Dispersion polymers are normally used in the form of sub-micron size particles suspended in aqueous medium, optionally containing minor amounts of organic solvent. Such dispersions are also known as latexes or latices. The particles can consist of copolymers derived from ethylenically unsaturated addition copolymerisable monomers. For the purposes of this specification such polymers are referred to as addition polymers, the term copolymer is, for convenience intended to cover homopolymers. Known examples of such polymers include the polyacrylates and polymethacrylates usually referred to as acrylics and made using known methods by addition polymerisation of the esters of acrylic and/or methacrylic acid in water. The particles may alternatively consist of polyurethane polymers made by known methods of reacting polyols with isocyanates. Such methods can be found in the article by J. W. Rosthauser and K. Nachtkamp titled 'Waterborne Polyurethanes' in 'Advances in Urethane Science and Technology', volume 10 published in 1987 and edited by K. C. Frisch and D. Klempner, the contents of which article are herein incorporated by reference.

Polyurethane dispersion polymers are an important class of binders for aqueous coating compositions, as they produce excellent properties, such as chemical and stain resistance, hardness and toughness in the solid coating. These polymers can contain significant portions of urea groups as a result of the manufacturing process.

Nevertheless, for the purposes of this specification the term polyurethane is intended to cover both polyurethane polymers and polyurethane-urea polymers.

Aqueous dispersions of addition polymer particles, such as acrylics are alternative sources of binder polymers in aqueous coating compositions. A wide range of such addition polymer dispersions is available, giving coating compositions with properties that are complementary to those of the polyurethane dispersions, and at significantly lower cost. Dispersions of addition copolymer particles derived from the esters of acrylic acid and methacrylic acid monomers (referred to as "acrylics") are especially useful in coatings and adhesive applications. This is because the acrylic monomers are themselves easily copolymerised with other acrylic monomers as well as being copolymerisable with other monomers such as the vinyl monomers, for example styrene and its derivatives. For example, where styrene is used, a styrene-acrylic copolymer results. For the purposes of this specification it is intended that the use of the term acrylic includes such copolymers.

In order to get a better balance of properties, for example hardness and extensibility and reduced cost, mixtures of polyurethane dispersions and addition polymer dispersions derived from ethylenically unsaturated monomers are known. These contain particles of addition copolymer such as acrylic polymer and separately, polyurethane polymer particles. However, such mixing produces a physical blend of the separately formed aqueous dispersions of polyurethane and acrylic copolymers resulting in an unstable mixture of particles which over time may separate and/or flocculate so becoming unstable and eventually unusable. This is a particular problem when the vinyl addition copolymer is an acrylic.

In order to achieve the required stability and optimum properties it is necessary that each particle comprises a mixture of closely associated polyurethane and acrylic polymer rather than the blend of different particles referred to above. Dispersions containing polyurethane-acrylic hybrid particles can be made by known methods. Such methods can be found in U.S. Pat. No. 4,198,330 published in April 1980. The first step of this is to make a water dispersible polyurethane prepolymer carrying unreacted isocyanate groups. This step is carried out in the absence of water. The molecular weight of this prepolymer is increased by chain extension achieved by subsequently dispersing the prepolymer in water, using shear, and causing the isocyanate moieties to react with water or chain extender such as to form a polyurethane dispersion. Addition copolymerisable monomers are then added to the dispersion and caused to polymerise resulting in a dispersion of polyurethane-acrylic hybrid particles.

The isocyanates used in the manufacture of aqueous polyurethane-addition polymer dispersions in general and polyurethane-acrylic dispersions in particular are generally referred to as polyisocyanates. They usually carry two isocyanate moieties each but can carry up to about four or even five but hardly ever less than about 1.8. They broadly fall into two classes. The first type is aliphatic, where the isocyanate moieties are attached to an aliphatic carbon, for example as in dicyclohexyl methane diisocyanate (HMDI) and isophorone diisocyanate (IPDI). The second type is aromatic, where the isocyanate moieties are attached directly to a carbon atom forming part of an aromatic ring, for example as in methane diphenyl diisocyanate (referred to as MDI for convenience) and toluene diisocyanate (TDI). Such aromatic diisocyanates are available as isomers. For example, MDI is available as the 2,2' or 2,4' or 4,4' isomer and mixtures thereof. The numbers indicate the position of the isocyanate moieties on the phenyl rings as shown below.

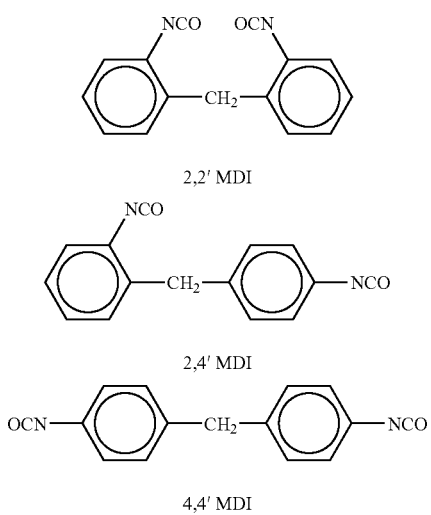

Because of the close proximity of the isocyanate moieties at the 2 and 2' position to the very large phenyl ring on the bridging methylene group the reactivity rate of each such moiety is much slower compared to an isocyanate moiety at the 4 or 4' position, which has the much smaller hydrogen atoms as its nearest neighbours. The reason for this is thought to be that the nearby bulky phenyl group prevents easy access of the co-reactant, for example a hydroxyl moiety of a polyol, to the isocyanate moiety. The isocyanate moieties at the 2 and 2' positions are said to be sterically hindered. Of the MDI isomers 4,4' is the most reactive followed by 2,4' and 2,2'.

Similarly, TDI is available as the 2,4 or the 2,6 isomer and mixtures thereof.

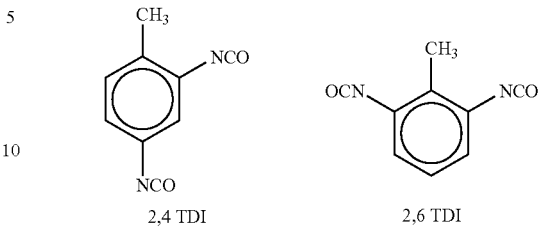

The same arguments apply to TDI. The isocyanate moieties at the 2 and 6 position are sterically hindered and hence are much less reactive than the isocyanate moiety at the 4 position. The steric hindrance in the case of the TDI is of course caused by the methyl group on the carbon atom next to the isocyanate moieties. In fact in aromatic polyisocyanates, a substituent next to an isocyanate moiety causes the isocyanate moiety to be sterically hindered. Of the TDI isomers 2,4 TDI is more reactive than 2,6 TDI as in the former only one isocyanate moiety is sterically hindered whereas both are hindered in 2,6 TDI.

Aliphatic diisocyanates may also be available as isomers but the effect on reactivity rates is of little consequence in practice when selecting the aliphatic diisocyanate to use.

A discussion of steric hindrance of isocyanate moieties is provided in Polyurethane Chemistry and Technology, Part 1: Chemistry, page 173-177 Published by Interscience Publishers, 1962 which pages are hereby incorporated by reference.

It is known that solutions of polyurethane polymers in organic solvent, derived from aromatic polyisocyanates, have desirable properties. MDI is particularly useful over the aliphatic polyisocyanates as well as other aromatics. The polyurethane polymers derived from it produce harder films of increased tensile strength (see Table 3.7 of Polyurethane Elastomers, second edition published by Elsevier Science Publishers, 1992) which are both important features when formulating coatings. Polyurethane polymers derived from 4,4' MDI have even higher tensile strength than 2,4' MDI. Furthermore, there is the added advantage of the lower cost of MDI over the more commonly used aliphatic diisocyanates. The 4,4' MDI isomer is even lower cost than 2,4' MDI and hence preferred to the 2,4' MDI isomer.

However, a problem associated with using only aromatic polyisocyanates in the manufacture of the aqueous dispersions is that the isocyanate moieties they carry are extremely reactive towards hydroxyl moieties, for example those found in water. This is especially so in the presence of tertiary amines such as triethylamine which catalyse the reaction. The reaction with water causes the molecular weight, and consequently the viscosity of the polyurethane prepolymer, to rise very rapidly during the dispersion stage due to chain extension. This makes the dispersions difficult to handle because it is difficult to create sufficiently high shear to help disperse the resulting polyurethane and thus create a stable dispersion of fine particles. This is a particular problem for aromatic polyisocyanates which are free of sterically hindered isocyanate moieties, for example as in 4,4' MDI. In fact the isocyanate moieties of 4,4' MDI are up to 500 times more reactive than the isocyanate moieties of aliphatic diisocyanates. The reaction with water also results in the evolution of carbon dioxide gas, leading to unwanted foam generation which can dry on the walls of the reactor vessel subsequently to fall into the dispersion causing problems during filtration such as blockage of filtration equipment.

In order to prevent unreacted aromatic isocyanate moieties coming into contact with water and thus avoid the disadvantages described above, special methods have been developed. Such methods are described in U.S. Pat. No. 4,269,748 published in 1981 and U.S. Pat. No. 6,248,415 published in 2001. However, both methods require large amounts of acetone, which is hazardous to handle during the manufacturing process. Furthermore, even where attempts are made to recover the acetone from the final dispersion, small amounts will necessarily remain therein and will inevitably escape into the environment when the dispersion is used causing a pollution hazard.

The reaction with water described above is not a problem for those aromatic polyisocyanates which carry at least one sterically hindered isocyanate moiety, such as 2,4' MDI or 2,4 TDI, because only the sterically unhindered one of the isocyanate moieties, at the 4 or 4' position, is highly reactive, whilst the second at the 2 position is more than ten times less reactive. It is thought that the more reactive isocyanate moiety reacts first to form the polyurethane prepolymer, leaving the less reactive second isocyanate moiety to react with the water during the chain extension step. As this second isocyanate moiety is slower to react, there is much less of an increase in molecular weight and so the viscosity of the dispersion polyurethane polymer is sufficiently low and therefore is thought, much easier to disperse into fine particles to form a stable and useable dispersion.

Attempts to make aqueous dispersions of polyurethane-addition polymer hybrid particles using only aromatic polyisocyanate free of sterically hindered isocyanate moieties to produce the polyurethane portion of the particles proved unsuccessful, resulting in unusable, flocculated dispersions. Replacing a portion of such polyisocyanate with aromatic polyisocyanate carrying some sterically hindered isocyanate moieties results in very large particles. These are unsuitable for many applications where smooth, thin and transparent films are required, for example in coatings, including paint coatings and adhesives. Such large particles also have a tendency to settle under the influence of gravity over time rendering the dispersion difficult or impossible to use. These large particles (often referred to as "bits") must be removed from the dispersion by time consuming filtration. In addition, reactors used to manufacture the dispersion become heavily coated with residues of polymer, known as build-up. Build-up is in fact a layer of polymer adhering to the interior surfaces of the reactor including the surfaces of the stirrer used to mix the contents. This both reduces the yield of useable polymer and requires time consuming intricate cleaning. In some cases a dispersion of particles cannot be formed at all and the polymer is flocculated and unusable.

It has now been found that improved aqueous dispersions of polyurethane-addition polymer hybrid particles can be made where the polyurethane portion is derived from a mixture of aliphatic polyisocyanate with aromatic polyisocyanate essentially free of sterically hindered isocyanate moieties. This has the further advantage that such a mixture results in improved resistance to yellowing of the resulting solid coatings when exposed to ultra violet light compared to an aromatic only system.

It is an object of the invention to provide improved aqueous dispersions of polyurethane-addition polymer hybrid particles wherein the polyurethane polymer is derived from at least one aromatic polyisocyanate essentially free of sterically hindered isocyanate moieties and at least one aliphatic polyisocyanate and which are of small particle size. An alternative object of this invention is to provide such dispersions substantially free of bits. An alternative object is to provide a coating of improved resistance to bleach solutions.

Accordingly there is provided an aqueous dispersion of polyurethane-addition polymer hybrid particles, the particles comprising i) polyurethane polymer
ii) addition copolymer of ethylenically unsaturated copolymerisable monomers where the polyurethane polymer of i) is the reaction product of
a) aromatic polyisocyanate
b) aliphatic polyisocyanate
c) compound containing two hydroxyl moieties reactive with the isocyanate moities of a) and b)
d) compound containing at least one dispersing moiety and at least one moiety reactive with the isocyanate moieties of a) and b)
e) chain extender compound characterised in that the aromatic polyisocyanate is essentially free of sterically hindered isocyanate moieties.

Preferably, the ratio of the total number of isocyanate moieties from the aromatic polyisocyanate to the total number of the isocyanate reactive moieties of c) and d) is from 0.50 to 1.45. This produces low levels of build-up and bits in the dispersion, frequently less than 0.2% by weight. More preferably the ratio is from 0.5 to 1.3 as this provides the least amount of build-up and bits. Even more preferably the ratio is from 0.8 to 1.25.

One advantage of such aqueous dispersions is that the dispersions contain lower amounts of bits and build-up. Coating compositions derived from the dispersions have improved solvent resistant properties and resistance to water and aqueous solutions of bleach. Unpigmented compositions, such as varnishes are also less hazy both as the liquid coating and as the solid dried coating.

The average number of isocyanate moieties on the polyisocyanates is known as the isocyanate functionality. In order to avoid gelation the isocyanate functionality of the aromatic polyisocyanate is preferably from 1.8 to 2.3 and more preferably from 1.9 to 2.1. In the case of the aliphatic polyisocyanate, the isocyanate functionality can be as high as 4.0. Preferably, it is from 1.5 to 4.0, more preferably it is from 1.7 to 3.0 and most preferably it is from 1.8 to 2.2.

Suitable examples of aromatic polyisocyanates that are free of sterically hindered isocyanate moieties include those that have only a hydrogen atom on each of the aromatic ring carbons adjacent the aromatic ring carbon carrying an isocyanate moiety. Alternatively and additionally there may be a fused aromatic ring adjacent to the aromatic ring carbons carrying an isocyanate moiety. Preferred examples include 4,4' MDI (also known as 4,4' methane diphenyl diisocyanate and available from Bayer as Desmodur™ 44 ML), para-phenylene diisocyanate, carbodiimide modified 4,4' MDI (available as Lupranat MM103 from Elastogran) and 1,5 naphthalene diisocyanate. More preferably aromatic diisocyanates are used as the risk of gelation is minimised. Even more preferably 4,4' MDI is used as it is readily available and produces aqueous dispersions which can be formulated into hard and tough coatings.

Examples of suitable aliphatic polyisocyanates which may be used include the aliphatic diisocyanates such as hexamethylene diisocyanate, isophorone diisocyanate, also known as IPDI (available as Desmodur I™ from Bayer), cyclohexane-1,4 diisocyanate, 4,4'dicyclohexyl methane diisocyanate, also known as HMDI (available as Desmodur W™ from Bayer), trimethyl-1,6 diisocyanatohexane and m-tetramethylxylene diisocyanate. Isocyanurates are also useful aliphatic polyisocyanates. Suitable examples include the isocyanurate of isophorone diisocyanate (available as Desmodur Z4370™ from Bayer) and the isocyanurate of 1,6 hexamethylene diisocyanate (available as Tolonate HDT-90™ from Rhodia). Both are substantially trimeric. Preferably, aliphatic diisocyanates are used. Even more preferred is 4,4'dicyclohexyl methane diisocyanate as this produces solid coatings of especially good resistance to water.

The ratio of aromatic polyisocyanate to aliphatic polyisocyanate, calculated on a molar basis, may vary from 10:90 to 90:10, preferably from 15:85 to 85:15, even more preferably from 35:65 to 65:35. The precise ratio will depend on the type of product the dispersion is to be used in. For example, the preferred ratio of aromatic polyisocyanate to aliphatic polyisocyanate will differ depending on whether the dispersion is to be formulated into a paint coating or an adhesive. A paint coating generally requires greater hardness than an adhesive and consequently the dispersion used to make it requires a relatively higher amount of the aromatic polyisocyanate.

Hybrid polyurethane-addition polymer particles each contain both polyurethane polymer and addition polymer. These can be core-shell type particles where one of the polymers forms the outer portion, or shell of the particle and the other the inner portion or core. Usually the addition polymer migrates spontaneously to the core position. Alternatively and additionally 'current bun' type particles can result, where one polymer immiscible in a second polymer exists as inclusions within particles of that second polymer. Hybrid particles can also be formed in which the polymers are intimately mixed within. The precise nature of the particle architecture is determined by the surface energy characteristics of the polyurethane and addition polymer. Preferably the polymer particles are of the core-shell type with the polyurethane portion forming the shell portion and the addition polymer the core. Even more preferably the polymer composition of each particle in the dispersion is substantially the same one with another.

The weight average mean diameter of the particles is preferably less than 1000 nm, more preferably from 20 to 650 nm and even more preferably from 20 to 200 nm. Most preferably the mean particle diameter is from 20 to 90 nm as this produces substantially transparent dispersions. Unpigmented coatings, such as varnishes, derived from dispersions of such size, are themselves transparent. These are preferred by users. Additionally, the dried coatings will themselves be more transparent and less hazy than coatings derived from dispersions of larger particles.

The relative proportions of polyurethane polymer and addition polymer making up the particles can be varied according to the properties required of the dispersion and the properties desired in, for example a paint coating or adhesive formulated using the dispersion. A minimum level of polyurethane is required to stabilise the particle. The ratio of polyurethane to the addition polymer calculated on a weight basis can vary from 10:90 to 90:10. Preferably it is from 20:80 to 80:20, more preferably from 30:70 to 70:30 and most preferably from 40:60 to 60:40. Where hardness and tensile strength are important features, in a coating for instance, the amount of polyurethane polymer will be greater than the addition polymer. If low cost is the prime requirement, for example in adhesives, it can be achieved by making the addition polymer the predominant polymer component.

Preferably the weight average molecular weight, as measured by gel permeation chromatography, of compounds containing at least two hydroxyl moieties reactive with the isocyanate moieties of the aromatic and aliphatic polyisocyanate is from 400 to 6000 Daltons, more preferably from 450 to 4000 Daltons and even more preferably from 450 to 3000 Daltons. Suitable examples of such compounds include the polymeric diols; that is polymers or copolymers containing about two, preferably two hydroxyl moieties: and polymeric polyols; that is polymers or copolymers containing more than about two, preferably more than two, hydroxyl moieties. Examples of suitable polymeric diols include polyether diols, polycarbonate diols, polyester diols and mixtures thereof. More preferred are the polyether diols and polyester diols. Most preferred are the polyether diols as they are most hydrolytically stable and thus retain the desirable properties for the longest time when stored prior to use. Suitable examples of polyether diols include Terathane 1000™ and Terathane 2000™ (available from DuPont). The polyester diols may optionally carry carboxylic acid groups. Monomeric diols are low molecular weight diols, preferably of molecular weight of from 60 to 300 Daltons. Optionally monomeric diols may be used in addition to the polymeric diols. Suitable examples of monomeric diols include ethylene glycol, diethylene glycol, neopentyl glycol and cyclohexane dimethanol. Preferably cyclohexane dimethanol is used. Most preferred are mixtures of polyester diols and monomeric diols as varying the relative amounts of the two allows the mechanical properties of the dried coating, such as hardness to be varied. Preferably, the amount of the compounds containing at least two hydroxyl moieties reactive with the isocyanate moieties of the aromatic and aliphatic polyisocyanate is from 1 to 10% by weight of the total polyurethane polymer content, more preferably from 1 to 6% by weight of the total polyurethane polymer content formulation.

The polyester diols and polyols are conveniently prepared by normal polyesterification processes from diacids such as adipic acid, isophthalic acid, phthalic anhydride, dimer fatty acids and the like, and monomeric diols such as ethylene glycol, diethylene glycol, neopentyl glycol, 1,4 butane diol, 1,6 hexane diol and the like. The number of hydroxyl moieties per polyester chain can be controlled by the level of molar excess of the monomeric diol over the diacid. Hydroxyl functional compounds, including polyols, containing more than two hydroxyl moieties can be used but care must be taken to avoid crosslinking and hence gelation. Linear polyesters are preferred. Some branching can be introduced into the polyester polyol by using a small amount of a triol, such as trimethylol propane. Suitable examples of such polyester diols include Bester 100, 101 and 120 (available from Rohm and Haas, Italia).

Suitable examples of compounds containing more than two hydroxyl moieties include glycerol, trimethylol propane and sorbitol.

The compound containing at least one dispersing moiety and at least one moiety reactive with the isocyanate of the polyisocyanate facilitates dispersion of the urethane prepolymer particles. The isocyanate reactive moiety serves to covalently attach the compound to the urethane polymer thereby providing good self-emulsifying properties in the absence of external, that is unreacted, surfactants, although these may be used if desired. The isocyanate reactive moiety is preferably amino or hydroxyl. More preferred is hydroxyl. The compound may carry an ionisable or non-ionisable dispersing moiety. Preferably the moiety is ionisable. Where it is ionisable, it is preferred that the molecular weight of the compound, including the dispersing moiety, is less than 300

Daltons. The urethane prepolymer preferably contains from 2 to 15% by weight of such a compound and more preferably from 5 to 14% by weight. The ionisable moiety may be acidic or basic. Preferably it is acidic. Such compounds include the dihydroxy alkanoic acids such as dimethylol propionic acid and dimethylol butanoic acid. Preferably dimethylol propionic acid is used.

Where the dispersing moiety is non-ionic the molecular weight of the compound carrying it is preferably from 500 to 2000 Daltons, more preferably from 750 to 1750 Daltons. The urethane prepolymer preferably contains from 5 to 30% by weight, more preferably from 7 to 20% by weight of the compound. Suitable examples of compounds carrying non-ionisable dispersing moieties include methoxy polyethylene glycol, polyethylene glycol, ethylene oxide-propylene oxide copolymers such as the Synperonics™ (available from Uniqema, Netherlands), polyether diols, polyoxypropylene diamines such as Jeffamine™ 2000.

Preferably the moiety reactive with the isocyanate moieties is different to the dispersing moiety.

Where the dispersing moiety is ionisable, in order to be effective at dispersing the polymer particles in water it must be at least partially neutralised with an appropriate neutralising agent. Where the moiety is an acid, a base is preferably used to neutralise it. Examples of suitable neutralising bases include aqueous ammonia, alkali metal hydroxides and amines. Amines are most preferred as they have a minimum adverse affect on the properties of the dried coating. Suitable amines include secondary and tertiary amines such as triethylamine and dimethyl ethanolamine. Where hard, tough coatings such as may be required for floor paint coatings it is preferable to use tertiary amines. Such tertiary amines also reduce the risk of gelation during the chain extension stage. Secondary amines may be used, preferably in combination with tertiary amine where increased tack is desirable, such as in an adhesive coating.

Where the ionisable moiety is a base an acid is preferably used. Examples of suitable acids include the organic acids such as formic acid, acetic acid and lactic acid. Lactic acid is preferred as it does not have an unpleasant odour.

A combination of compounds each carrying ionic or non-ionic moieties may also be used to facilitate the dispersion of the particles.

Preferably, the aqueous dispersions of the invention are free of added, external surfactants as the presence of such materials can cause the water resistance and bleach resistance of the solid coatings to be adversely affected.

The chain extender compound must be capable of reacting with the excess isocyanate moieties of the polyurethane prepolymer. Such chain extending increases the molecular weight of the prepolymer. Suitable examples of chain extender include water and compounds with two moieties reactive with the excess isocyanate on the polyurethane prepolymer. Preferred chain extender compounds include the diamines. Diamines are compounds which contain two amine groups. Suitable examples of diamines include the linear diamines such as ethylene diamine, 1,2 propane diamine, 1,3 propane diamine, 1,4 butane diamine, 1,5 pentane diamine and 1,6 hexane diamine. Other examples of suitable linear diamines include the Jeffamine™ range such as the polyoxypropylene diamines available as Jeffamine™ D230, Jeffamine™ D400 and Jeffamine™ D2000 as well as Jeffamine™ EDR-148, a triethylene glycol diamine. Examples of suitable linear branched diamines include 2 methyl 1,5 pentane diamine, 2,2,4 trimethyl-1,6 hexane diamine and 2,4,4 trimethyl-1,6 hexane diamine. Cyclic diamines may also be used, such as isophorone diamine, cyclohexane diamine, piperazine and 4,4'-methylene bis(cyclohexyl amine). Most preferred are the water soluble diamines such as ethylene diamine. Hydrazine may also be used.

The addition copolymer can comprise any polymer (including copolymers) of copolymerisable ethylenically unsaturated addition monomers. Examples of suitable ethylenically unsaturated monomers include (meth)acrylic acid esters, amides, and nitriles, vinyl monomers and vinyl esters.

Using the nomenclature of (meth)acrylate to represent both acrylate and methacrylate, examples of suitable acrylic acid esters and methacrylic acid esters are alkyl esters, preferably methyl(meth)acrylate, propyl(meth)acrylate, butyl(meth)acrylate, 2-ethyl hexyl(meth)acrylate and alkoxy poly(oxyethylene) (meth)acrylate. Small amounts of methacrylic acid and/or acrylic acid may also be used. Hydroxy functional monomers such as hydroxy ethyl(meth)acrylate and hydroxy isopropyl(meth)acrylate may be included also. Examples of suitable vinyl monomers include styrene and alpha methyl styrene, vinyl propionate, vinyl butyrate, vinyl acetate and vinyl versatate. Preferably the addition copolymer is derived from the esters of acrylic acid, methacrylic acid and optionally styrene and/or its derivatives.

The glass transition temperature, or Tg, of the addition copolymer may be varied by copolymerising monomers of appropriate Tg. In this way copolymers which are hard, soft or of intermediate Tg can be made, which in combination with the choice of polyurethane can produce a wide range of physical film properties such as tack (or stickiness), hardness and extensibility. Preferably the Tg of the addition copolymer is from −70 to 185° C., more preferably from −20 to 120° C. For adhesives the more preferred range of Tg is from −70° C. to 0° C. as this results in improved tack. For copolymer dispersions intended for use in paint coatings the more preferred range is from −20° C. to 120° C. as this produces a more durable paint which is better resistant to knocks and scuffs.

A process of making the aqueous dispersions of the invention comprises the steps of i) reacting the compound containing the two hydroxyl moieties, aromatic polyisocyanate, aliphatic polyisocyanate, and the compound containing at least one dispersing moiety and at least one moiety reactive with the isocyanate moieties, to form a dispersible urethane prepolymer ii) dispersing and chain extending the dispersible prepolymer in aqueous medium to form a dispersion iii) causing ethylenically unsaturated monomers to copolymerise in the aqueous dispersion to form a dispersion of polyurethane-addition polymer hybrid particles.

A preferred process of making the aqueous dispersions wherein the dispersing moiety is ionisable comprises the steps of i) reacting the compound containing two hydroxyl moieties with a molar excess of isocyanate moieties provided by the mixture of aromatic polyisocyanate and aliphatic polyisocyanate; preferably the reaction is carried out at elevated temperature and most preferably at from 40 to 100° C. and under a nitrogen blanket with stirring, ii) reacting some of the excess isocyanate moieties of the reaction product of i) with the compound containing at least one ionisable group and at least one moiety reactive with the isocyanate moieties, to form a dispersible ionisable urethane prepolymer, iii) forming a solution of the ionisable polyurethane prepolymer in the ethylenically unsaturated monomers and dispersing the solution in water in the presence of a neutralising agent to form an emulsion, iv) causing the molecular weight of the prepolymer to increase by reacting it with the chain extender compound, v) and causing the ethylenically unsaturated monomers to copolymerise.

In order to form the ionisable urethane prepolymer, preferably the molar excess of isocyanate moieties of step i) is sufficient to react with the desired molar amount of the compound containing the ionisable moiety of step ii) and with the chain extender of step iv). More preferably a molar excess of about 50% over the compound containing the two hydroxyl moieties is used. The neutralising agent may be added to the ionisable urethane prepolymer solution and the resulting mixture dispersed in water. It is preferred that the neutralising agent is added to the water and the prepolymer solution added to it and then dispersed as this reduces the risk of gelation.

Preferably the emulsion can be formed using only moderate stirring in a reactor or optionally by passing the mixture through a mechanical homogeniser such as a Silverson Emulsifier, available from Silverson Machines Ltd, Chesham, Bucks, UK or by using an ultrasonic homogeniser such as a Sonolator, available from Sonic Corporation, Stratford, Conn., USA.

The conditions required to produce an emulsion of the desired droplet size will depend on the equipment used and can be determined by simple variation of the mixing conditions used. Preferably the solution of dispersible prepolymer can be dispersed using only moderate stirring as this is less stressful on the equipment. Preferably the droplets of the solution have a diameter of less than 1000 nm and more preferably from 20 to 650 nm and most preferably from 20 to 350 nm. Smaller droplets produce smaller particles which are preferred as they produce more transparent solid films.

The ethylenically unsaturated monomers are caused to copolymerise by heating the emulsion of droplets, containing emulsion polymerisation initiators, to a temperature of from 30° C. to 98° C., preferably from 40° C. to 80° C. Where redox initiator combinations are used, the preferred polymerisation temperature is from 20° C. to 80° C., more preferably from 30° C. to 50° C. Redox initiators are sufficiently effective that additional heating above ambient temperature is unnecessary.

Suitable emulsion polymerisation initiators include peroxides such as tertiary butyl hydroperoxide, hydrogen peroxide and cumene hydroperoxide; persulphates such as potassium persulphate and ammonium persulphate; azo types such as 4,4' azobis(4-cyanopentanoic acid). Preferably from 0.002% by weight of the initiator is used, calculated on the amount of ethylenically unsaturated addition polymer. Redox initiator combinations may also be used. Suitable examples include tertiary butyl hydroperoxide with ascorbic acid or sodium metabisulphite or sodium formaldehyde sulphoxylate; hydrogen peroxide with ascorbic acid or sodium metabisulphite or sodium formaldehyde sulphoxylate; cumene hydroperoxide with ascorbic acid or sodium metabisulphite or sodium formaldehyde sulphoxylate.

Optionally, metal salts such as copper, chromium and iron salts can be added when redox pairs are used. Such metals, usually in the form of water soluble salts, for example iron(II) sulphate, are especially useful where the natural level of dissolved metals in the reaction mixture are low. This can occur when a glass-lined reactor is used or a metal chelating agent is present. The presence of the added metal salts ensures that the redox system works effectively. Preferably the level of added metal salt is kept to a minimum to avoid discolouration of the dispersion itself and any coatings derived from it. This is generally less of a problem for adhesives.

The preferred initiator system is the redox combination of tertiary butyl hydroperoxide and ascorbic acid, the latter optionally in the form of sodium ascorbate. Such redox combinations allow the polymerisation to be carried out at reduced temperatures.

Useful applications of the aqueous dispersions of this invention include providing polymeric binders useful in the fields of coating compositions such as paints suitable for painting wood, floors, ceilings, metal—especially vehicles, beverage and food containers; plastics and masonry—such as walls. The paint coatings may be formulated as primers, undercoats and topcoats—including lacquers, varnishes, woodstains, inks—including printing inks. The dispersions are also useful in the field of adhesives, especially laminating adhesives and pressure sensitive adhesives; and as additives in cementitious and gypsum based products such as plasters, fillers and the like.

Accordingly the invention also provides an aqueous coating composition characterised in that the composition comprises an aqueous dispersion of polyurethane-addition polymer hybrid particles according to this invention. Preferably the coating composition comprises the aqueous dispersion wherein the addition polymer is derived from the esters of acrylic acid/or methacrylic acid and optionally styrene and its derivatives. Other aqueous polymer dispersions may optionally be added.

The coating composition can also contain other ingredients that are standard for coatings such as pigments, fillers, extenders, waxes, rheological modifiers, dispersants, antifoams, tackifiers, plasticisers, crosslinking agents, flow aids and biocides and combinations of any two or more of these such as those described in the third edition of the book "Introduction to Paint Chemistry" by G. P. A. Turner published in 1998 by Chapman Hall of London.

Preferably the coating composition is a paint coating and even more preferably it is pigmented paint suitable for painting wood or walls. Most preferably it is a varnish for painting wood floors.

Examples of suitable crosslinking agents include the carbodiimides, aziridines, polyisocyanates and aminoplast resins such as melamine formaldehydes and urea formaldehydes.

The coating compositions may be applied to a substrate by all the usual application methods including brush, roller, blade and spray equipment.

Accordingly the invention also provides a method of applying an aqueous coating composition to a substrate by brush, roller, blade or spray equipment characterised in that the coating composition is according to the invention as hereinbefore described.

The invention also provides a water dispersible polyurethane prepolymer comprising a) aromatic polyisocyanate b) aliphatic polyisocyanate c) compound containing two hydroxyl moieties reactive with the isocyanate moieties of a) and b)

d) compound containing at least one dispersing moiety and at least one moiety reactive with the isocyanate moieties of a) and b)

characterised in that the aromatic polyisocyanate is essentially free of sterically hindered isocyanate moieties.

The invention is further illustrated by the following examples which employ various proprietary reactants as set out below.

Terathane 1000™ and Terathane 2000™ are available from DuPont, Wilmington, Del. 19899, USA.

Bester 101™ is available from Rohm and Haas (Italia), Parona Lomellina, Italy

Desmodur 44 ML™ flake, Desmodur W™, Desmodur I™ and Desmodur Z4370™ are available from Bayer, D-51368, Leverkusen, Germany Lupranat MI™ and Lupranat MM103™ are available from Elastogran GmbH, D-49440 Lemforde, Germany t-butyl hydroperoxide, (Luperox TBT 70x) is available from ELF Atochem, France.

Cyclohexane dimethanol is available from Eastman Chemical Co., Kingsport, Tenn. 37662, USA.

Byk 028™, Byk344™ and Aquacer 513™ are available from Byk-Chemie GmbH, Abelstrasse 45, D-46483 Wesel, Germany.

Coatex BR 100P™ is available from Coatex S.A., Lyon Nord, France.

The invention will now be illustrated by the following examples.

Preparation of an Aqueous Dispersion of Polyurethane-Acrylic Hybrid Polymer Particles.

The acrylic portion of the polyurethane-acrylic polymer of the Examples of the invention and of the Comparative Examples all had a Tg of 56° C.

EXAMPLE 1

To a 1 litre spherical glass flask fitted with a metal stirrer and a nitrogen feed was added, under nitrogen, 75.27 g of Terathane 1000™ (which is polytetramethylene ether glycol of molecular weight 1000 Daltons), 56.45 g of Desmodur 44 ML™ (4,4' MDI) in flake form and 29.58 g of Desmodur W™ (4,4' dicyclohexyl methane diisocyanate). The temperature of the contents was raised to 60° C. and held for 30 minutes whilst stirring. A solution of 20.17 g of dimethylol propionic acid (DMPA) in 72.56 g of N-methylpyrollidone (NMP) was added to the reactor and maintained at 60° C. for one hour. The contents were cooled to 50° C. and 37.10 g of butyl acrylate and 147.76 g of methyl methacrylate monomer were added to the flask over 20 minutes using a pump. The polyurethane prepolymer dissolved in the monomers to form a solution. The temperature of the solution fell to 34° C. The solution of prepolymer was pumped into a stirred 2 litre cylindrical, flat bottomed fermentation vessel to which had previously been added 493.97 g of tap water and 15.21 g of triethyl amine. Vigorous agitation at 200 rpm was maintained in the second flask during the transfer whereupon a fine emulsion was formed. A solution of chain extender comprising 3.39 g ethylene diamine in 9.88 g of tap water was added to the emulsion and the temperature raised to 35° C. and held there for 15 minutes. At the end of this period 7.66 g of a 10% by weight aqueous solution of t-butyl hydroperoxide and 22.823 of a 1% by weight aqueous solution of sodium ascorbate. The temperature of the contents increased and reached a peak of 58° C. after which the temperature was reduced to 35° C. when a further 8.17 g of the 1% by weight aqueous solution of sodium ascorbate solution was added to ensure substantially complete polymerisation of the monomers.

The polymer composition of the particles was:
Polyurethane:Acrylic (PU:Ac) 1:1 by weight The polyurethane portion comprised 4,4'MDI, 4,4'dicyclohexyl methane diisocyanate, Terathane 1000 ™, dimethylol propionic acid and ethylene diamine with the mole ratio of functional groups being 3:1.5:1:2:0.75 respectively.

The resulting dispersion had a weight average mean diameter particle size of 102 nm. No build-up was present on the stirrer or the internal walls of the reactor and no bits were recovered during filtration through an 80 mesh nylon filter.

EXAMPLE 2

The same procedure as used in Example 1 was followed except that the weights used (in grams) were as indicated in Table 1.

The polymer composition of the particles was:
Polyurethane:Acrylic (PU:Ac) 1:1 by weight.

The polyurethane portion comprised 4,4'MDI, 4,4'dicyclohexyl methane diisocyanate, Terathane 1000™, dimethylol propionic acid and ethylene diamine with the mole ratio of functional groups being 3.45:1.05:1:2:0.75 respectively.

The resulting dispersion had a weight average mean diameter particle size of 139 nm. No build-up was present on the stirrer or the internal walls of the reactor and no bits were recovered during filtration through an 80 mesh nylon filter.

EXAMPLE 3

The same procedure as used in Example 1 was followed except that the ingredients and their weights (in grams) were as indicated in Table 1.

The polymer composition of the particles was:
Polyurethane:Acrylic (PU:Ac) 1:1 by weight.

The polyurethane portion comprised carbodiimide modified 4,4' MDI (in the form of Lupranat MM103™), 4,4'dicyclohexyl methane diisocyanate (in the form of Desmodur W™, Terathane 100 ™, dimethylol propionic acid and ethylene diamine with the mole ratio of functional groups being 3:1.5:1:2:0.75 respectively.

The resulting dispersion had a weight average mean diameter particle size of 85 nm. No build-up was present on the stirrer or the internal walls of the reactor and no bits were recovered during filtration through an 80 mesh nylon filter.

TABLE 1

|  | Example 1 | Example 2 | Example 3 |
|---|---|---|---|
| Polyurethane Pre-polymer |  |  |  |
| Terathane 1000 ™ | 75.27 | 76.83 | 74.70 |
| Desmodur 44 ML ™ flake | 56.45 | 66.26 | — |
| Lupranat MM103 ™ | — | — | 58.26 |
| Desmodur W ™ | 29.58 | 21.14 | 24.87 |
| DMPA Addition |  |  |  |
| Dimethylol propionic acid | 20.17 | 20.59 | 20.02 |
| N-methyl pyrrolidone | 72.56 | 55.45 | 71.13 |
| Acrylic Addition |  |  |  |
| Butyl acrylate | 37.10 | 37.78 | 36.37 |
| Methyl methacrylate | 147.76 | 150.48 | 144.84 |
| Dispersion Stage |  |  |  |
| Triethyl amine | 15.21 | 15.52 | 14.91 |
| Tap water | 493.97 | 503.06 | 494.04 |
| Chain extender |  |  |  |
| Ethylene diamine | 3.39 | 3.46 | 3.36 |
| Tap water | 9.88 | 10.06 | 19.61 |
| Initiator Addition |  |  |  |
| t-butyl hydroperoxide (10% soln) | 7.66 | 7.80 | 7.51 |
| Reductant Addition |  |  |  |
| Sodium ascorbate (1% soln) | 22.83 | 23.25 | 22.38 |

TABLE 1-continued

|  | Example 1 | Example 2 | Example 3 |
|---|---|---|---|
| Mop-up |  |  |  |
| Sodium ascorbate (1% soln) | 8.17 | 8.32 | 8.00 |
| Total | 1000.00 | 1000.00 | 1000.00 |

Preparation of Example 4 and Comparative Examples A and B:

The same procedure as used in Example 1 was followed except that the ingredients and their weights (in grams) were as indicated in Table 2.

EXAMPLE 4

Example 4 was prepared using a 2:1 mixture of 4,4' MDI and isophorone diisocyanate.

The polymer composition of the particles was: Polyurethane/Styrene:Acrylic (PU:St/Ac) 1:1 by weight.

The polyurethane portion comprised 4,4' MDI, IPDI, Bester 101™ (which is butane diol, neopentyl diol adipate polyester of molecular weight 1000 Daltons), cyclohexane dimethanol, dimethylol propionic acid and ethylene diamine with the mole ratio of functional groups being 5.87:2.93:1:1:2:1.2 respectively.

The resulting dispersion contained so many bits that it could not be filtered and insufficient dispersion was filtered to enable a reliable measurement of the particle size to be made. The walls of the reactor and the stirrer were heavily coated with build-up. However it is possible that such a resulting dispersion could be filtered by pressurized filter press as known to those skilled in the art possibly directly from the reactor and possibly with re-circulation for a series of pressurized filtering passes.

COMPARATIVE EXAMPLE A

Comparative Example A was prepared using 4,4' MDI only.

The polymer composition of the particles was: Polyurethane:Acrylic (PU:Ac) 1:1 by weight.

The polyurethane portion comprised 4,4' MDI, Terathane 1000™, dimethylol propionic acid with the mole ratio of functional groups being 4.5:1:2:0.75 respectively.

The resulting dispersion contained many bits and could not be filtered effectively. The weight average mean diameter particle size was measured at about 200 nm but this can only be taken as a rough guide due to the poor quality of the filtration. The stirrer and the internal walls of the reactor were coated in large amounts of build-up.

COMPARATIVE EXAMPLE B

Comparative Example B was prepared using a 1:1 mixture of 4,4' MDI and 2,4' MDI only, in the form of Lupranat MI™.

The polymer composition of the particles was: Polyurethane:Acrylic (PU:Ac) 1:1 by weight.

The polyurethane portion comprised a 1:1 mixture of 4,4' MDI and 2,4' MDI, Terathane 1000™, dimethylol propionic acid and ethylene diamine with the mole ratio of functional groups being 2.25:2.25:1:2:0.75 respectively.

The resulting dispersion had a weight average mean diameter particle size of 174 nm. Some build-up was noted on the stirrer and internal walls of the reactor and about 5 g of bits were recovered by filtration through an 80 mesh nylon filter. The weight of bits reduced to 3 g following drying at 150° C. which is equivalent to 0.3% by weight on the dispersion formulation. Following three months storage at room temperature the dispersion developed a thick layer of sediment which could not be redispersed and was disposed of. None of the examples of the invention developed such a sediment.

TABLE 2

|  | Example A | Example B | Example 4 |
|---|---|---|---|
| Polyurethane Pre-polymer |  |  |  |
| Bester 101 ™ |  |  | 51.85 |
| Cyclohexane dimethanol |  |  | 7.47 |
| Terathane 1000 ™ | 72.88 | 72.88 |  |
| Desmodur 44 ML ™ flake | 82.00 |  | 76.07 |
| Lupranat MI ™ | — | 82.00 |  |
| Desmodur I ™ |  |  | 33.73 |
| DMPA Addition |  |  |  |
| Dimethylol propionic acid | 19.53 | 19.53 | 13.90 |
| N-methyl pyrrolidone | 69.71 | 69.71 | 54.64 |
| Acrylic Addition |  |  |  |
| Butyl acrylate | 35.66 | 35.66 | 35.43 |
| Methyl methacrylate | 142.03 | 142.03 |  |
| Styrene |  |  | 155.05 |
| Dispersion Stage |  |  |  |
| Triethyl amine | 14.72 | 14.72 | 8.38 |
| Tap water | 512.82 | 512.82 | 509.01 |
| Chain extender |  |  |  |
| Ethylene diamine | 3.28 | 3.28 | 3.73 |
|  | Ex. 1 | Ex. 2 | Ex. 3 |
| Chain extender |  |  |  |
| Tap water | 9.50 | 9.50 | 10.18 |
| Catalyst Addition |  |  |  |
| Iron (II) Sulphate (1% solution) |  |  | 0.73 |
| Initiator Addition |  |  |  |
| t-butyl hydroperoxide (10% soln) | 8.07 | 8.07 | 7.89 |
| Reductant Addition |  |  |  |
| Sodium ascorbate (1% soln) | 21.95 | 21.95 | 23.53 |
| Mop-up |  |  |  |
| Sodium ascorbate (1% soln) | 7.85 | 7.85 | 8.41 |
| Total | 1000.00 | 1000.00 | 1000.00 |

The clarity of the dispersions of Examples 1, 2 and 3, as assessed by eye were all greater than for Comparative Examples A and B. The characteristics of dispersions A and B are shown in Table 3.

Preparation of Varnish Known as Example V1 Using the Dispersion of Example 1

The dispersion of Example 1 was converted to an unpigmented paint known as a varnish and referred to here as V1 using the following procedure.

To a 2 litre container was added 832.0 g of the dispersion of Example 1. To this was added 40.0 g of ethyl diglycol and 3.5 g of N-methylpyrrolidone whilst stirring.

To the container was further added the following ingredients:

| Byk 344 ™ | 4.0 g | a wetting agent |
|---|---|---|
| Aquacer 513 ™ | 50 g | a waterborne wax |
| Coatex BR 100P ™ | 4.0 g | a thickener |
| Tap water | 58.5 g | |
| Byk 028 ™ | 8.0 g | defoamer |

The mixture was stirred vigorously until a drawdown was free of any film defects such as craters. The last 15 minutes was under low speed stirring to enable the mixture to deareate.

The final solids content of the varnish was about 31% by weight with a pH of 8.2.

The viscosity, measured at about 23° C., using a number 6 ISO cup was 49 seconds.

Preparation of Varnishes V2, V3 and VB

The same procedure as used in V1 was followed. The same weights of ingredients were also used except that the dispersion of Example 1 was replaced by the dispersion of Example 2 and 3 and Comparative Example B respectively. In each case, the amount of the dispersion added to the container was adjusted to provide 288 g of solids. An amount of N-methylpyrrollidone was also added to maintain a substantially constant level of it in the overall formulation at about 6% by weight.

The solids content of each of V2, V3 and VB was about 31% by weight and the viscosity was about from 50 to 60 seconds.

Comparative Example A and Example 4 could not be converted and evaluated as varnishes as they were unfilterable by normal gravity filtration techniques.

Procedure for Assessing Gloss of the Dry Varnishes

A drawdown of the liquid varnish was made over glass as described above and allowed to dry. The gloss of the resultant solid varnish coating was measured using a Byk Chemie Gloss unit. The clarity was assessed by eye.

Procedure for Assessing Hardness of the Dry Varnishes

A drawdown over glass prepared as described above was allowed to age for 7 days at ambient temperature of about 23° C. The hardness of the resultant solid varnish coating was measured according to DIN 53157, using an Erichsen model 299/300 pendulum hardness tester from Erichsen GmbH and Co. KG, D-5870 Hemer-Sudwig, Germany Procedure for Assessing Water Spot Resistance of the Dry Varnishes The varnish was applied by brush to hardboard as described above and allowed to age for 7 days at ambient temperature of between 21° C. to 23° C. Approximately 1 $cm^3$ of tap water was applied to the solid varnish coating and covered using a watch glass. After 30 minutes the water was wiped off with a cloth and the state of the remaining varnish assessed according to the following scale:

5 varnish remains intact
4 varnish is slightly damaged
3 some of the varnish removed
2 most of the varnish removed
1 varnish completely removed exposing hardboard
S varnish swollen
W varnish whitened Procedure for Assessing Bleach Resistance of the Dry Varnishes The varnish was applied by brush to hardboard as described above. Approximately 1 $cm^3$ of bleach (2.5% by weight solution of sodium hypochlorite in water) was applied

TABLE 3

| | Example 1 | Example 2 | Example 3 | Comparative Example A | Comparative Example B |
|---|---|---|---|---|---|
| Isocyanate blend | 4,4' MDI & HMDI | 4,4' MDI & HMDI | Lupranat MM103; IPDI | 4,4' MDI | Lupranat MI[1] |
| Total Aromatic NCO (total):Aliphatic NCO (moles) | 2.0:1 | 2.3:0.7 | 2.0:1 | 1.0:0 | 1.0:0 |
| Aromatic NCO (free of sterically hindered NCO):OH (moles) | 1.0:1.0 | 1.15:1.00 | 1.0:1.0 | 1.5:1.0 | 0.75:1.0 |
| Total isocyanate:OH (moles) | 1.5:1.0 | 1.5:1.0 | 1.5:1.0 | 1.5:1.0 | 1.5:1.0 |
| Bits[2] (weight %) | 0 | 0 | 0 | Too bitty to filter | 0.3 |
| Mean particle size (nm) | 102 | 139 | 85 | ca 200 | 174 |
| Solids (weight %)[3] | 35.2 | 36.4 | 34.6 | 34.6 | 34.7 |
| Bulk clarity of dispersion[4] | Very slightly milky | Slightly milky | Very slightly milky | Opaque white | Opaque white |

[1]1:1 blend of 4,4' MDI and 2,4' MDI
[2]Bits measured by filtering dispersion through 80 mesh and drying. Expressed as % weight on total dispersion
[3]Measured at 150° C. for 1 hour
[4]Assessed by eye Testing of Varnishes V1, 2, 3 and B The dried solid varnish coatings were prepared for evaluation by drawing down the liquid varnish on a glass panel using a 100 μm spreader to give a dried coating of about 17 to 20 μm.

Alternatively, the varnish was applied by brush to hardboard in three coats with approximately two hours between coats to give a dried coating of from 40 to 45 μm.

Procedure for Assessing Clarity of the Liquid Varnishes

The liquid varnishes were assessed by eye for clarity by noting how milky they appeared in a container.

to the varnish and covered by a watchglass as above. After two hours the bleach was wiped off using a cloth and the state of the coating assessed using the same scale as used in the water spot test above.

The results of the tests are shown in Table 4

An advantage of the dispersions of the invention is that when converted into unpigmented paints or varnishes they are only slightly milky rather than opaque in the liquid state. This effect is thought to arise from the generally lower particle size of the particles of the invention compared to the Comparative Examples A and B. It is a further advantage that the clarity of the varnish in the dried, solid state is also greater than of the Comparative Examples. The dried, solid varnish is also substantially more resistant to bleach solution.

TABLE 4

| Dispersion | V1 Example 1 | V2 Example 2 | V3 Example 3 | VB Comparative Example B |
|---|---|---|---|---|
| Clarity (liquid state) | Very slightly milky | Slightly milky | Very slightly milky | Opaque |
| Clarity (dried state) | Clear | Clear | Clear | Very hazy |
| Gloss 60° (on glass) | 158 | 158 | 158 | 96 |
| Gloss 20° (on hardboard) | 61 | 55 | 61 | 40 |
| Erichsen hardness (s) | 158 | 146 | 160 | 163 |
| Water spot resistance | 5S recovering to 5 | 5S recovering to 5 | 5S recovering to 5 | 4W |
| Bleach resistance | 4 | 5 | 4 | 1 |

EXAMPLES 5, 6, 7, 8 AND 9

Further examples of the invention were made according to the procedure of Example 1 except where otherwise indicated below.

The weights (in grams) of the ingredients were as indicated in Table 5.

TABLE 5

| | Example 5 | Example 6 | Example 7 | Example 8 | Example 9 |
|---|---|---|---|---|---|
| Polyurethane Pre-polymer | | | | | |
| Bester 101 ™ | | 103.82 | 64.93 | 78.86 | |
| Terathane 2000 ™ | | | | | 69.57 |
| Terathane 1000 ™ | 75.17 | | | | |
| Cyclohexane dimethanol | | | 9.35 | | |
| Desmodur 44 ML flake ™ | 56.37 | 58.94 | 64.93 | 59.13 | 57.97 |
| Desmodur W ™ | | 38.85 | | | |
| Desmodur I ™ | 25.04 | | 28.84 | 26.26 | 25.73 |
| DMPA Addition | | | | | |
| Dimethylol propionic acid | 20.15 | 28.13 | 17.40 | 21.14 | 18.64 |
| N-methyl pyrrolidone | 53.02 | 66.85 | 72.42 | 54.19 | 70.85 |
| Acrylic Addition | | | | | |
| Butyl acrylate | 36.15 | 29.78 | 35.22 | 35.14 | 35.55 |
| Methyl methacrylate | 143.95 | 118.61 | | | 141.58 |
| Styrene | | | 154.14 | 153.79 | |
| Amine Addition | | | | | |
| Triethyl amine | | 10.72 | | | |
| Tap water | | | | | |
| Dispersion Stage | | | | | |
| Triethyl amine | 10.11 | 10.72 | 10.49 | 12.75 | 14.05 |
| Tap water | 529.39 | 468.84 | | 504.86 | 512.21 |
| Demin water | | | 506.02 | | |
| Chain extender | | | | | |
| Ethylene diamine | 3.39 | 4.45 | 3.90 | 3.55 | 5.22 |
| Tap water | 9.63 | 10.72 | 10.12 | 10.10 | 9.76 |
| Catalyst Addition | | | | | |
| Iron(II) sulphate (1% soln) | | | 0.73 | 0.73 | 0.70 |
| Initiator Addition | | | | | |
| t-butyl hydroperoxide (10% soln) | 7.46 | 10.05 | 7.84 | 7.83 | 7.56 |
| Reductant Addition | | | | | |
| Sodium ascorbate (1% soln) | 22.24 | 28.13 | 23.39 | 23.33 | 22.55 |
| Mop-up | | | | | |
| Sodium ascorbate (1% soln) | 7.96 | 11.39 | 8.35 | 8.35 | 8.06 |
| Total | 1000.00 | 1000.00 | 1000.00 | 1000.00 | 1000.00 |

EXAMPLE 5

The same procedure as used in Example 1 was followed except that immediately prior to the addition of the solution of DMPA in NMP the temperature of the reactor contents were reduced to 50° C. Following this addition the temperature was maintained at 60° C. for 30 minutes.

The polymer composition of the particles of Example 5 was:

Polyurethane:Acrylic (PU:Ac) 1:1

The polyurethane portion comprised 4,4' MDI, isophorone diisocyanate (in the form of Desmodur I™), Terathane 1000™, dimethylol propionic acid and ethylene diamine with the mole ratio of functional groups being 3:1.5:1:2:0.75 respectively.

The resulting dispersion had a weight average mean diameter size of 100 nm. No build-up was present on the walls of the reactor and no bits were recovered during filtration through an 80 mesh nylon filter.

EXAMPLE 6

The same procedure was followed as used in Example 5 except that the triethyl amine was added in two portions, one to the solution of prepolymer dissolved in monomers; and the other to the water in the cylindrical vessel.

The polymer composition of the particles of Example 6 was:

Polyurethane:Acrylic (PU:Ac) 1:1

The polyurethane portion comprised 4,4' MDI, 4,4' dicyclohexyl methane diisocyanate, Bester 101™, dimethylol propionic acid and ethylene diamine with the mole ratio of functional groups being 2.27:1.43:1:2.02:0.72 respectively.

The resulting dispersion had a weight average mean diameter size of 103 nm. No build-up was present on the walls of the reactor and no bits were recovered during filtration through an 80 mesh nylon filter.

EXAMPLE 7

The same procedure was followed as used in Example 5. A quantity of catalyst in the form of a 1% by weight solution iron(II) sulphate in water was added immediately prior to the initiator addition.

The polymer composition of the particles of Example 7 was:
Polyurethane:Acrylic (PU:St/Ac) 1:1

The polyurethane portion comprised 4,4' MDI, isophorone diisocyanate (in the form of Desmodur I™), Bester 101™, cyclohexane dimethanol, dimethylol propionic acid and ethylene diamine with the mole ratio of functional groups being 4:2:1:1:2:1 respectively.

The resulting dispersion had a weight average mean diameter size of 122 nm. No build-up was present on the walls of the reactor and no bits were recovered during filtration through an 80 mesh nylon filter.

EXAMPLE 8

The same procedure was followed as used in Example 7.
The polymer composition of the particles of Example 8 was:
Polyurethane:Acrylic (PU:St/Ac) 1:1

The polyurethane portion comprised 4,4' MDI, isophorone diisocyanate (in the form of Desmodur I™), Bester 101™, dimethylol propionic acid and ethylene diamine with the mole ratio of functional groups being 3:1.5:1:2:0.75 respectively.

The resulting dispersion had a weight average mean diameter size of 67 nm. No build-up was present on the walls of the reactor and no bits were recovered during filtration through an 80 mesh nylon filter.

EXAMPLE 9

The same procedure was followed as used in Example 7.
The polymer composition of the particles of Example 9 was:
Polyurethane:Acrylic (PU:Ac) 1:1

The polyurethane portion comprised 4,4' MDI, isophorone diisocyanate (in the form of Desmodur I™), Terathane 2000™ (which is polytetramethylene ether glycol of molecular weight 2000 Daltons), dimethylol propionic acid and ethylene diamine with the mole ratio of functional groups being 6.66:3.33:1:4:2.5 respectively.

The resulting dispersion had a weight average mean diameter size of 164 nm. No build-up was present on the walls of the reactor and approximately 1.6 g of bits were recovered during filtration through an 80 mesh nylon filter.

The invention claimed is:

1. An aqueous dispersion of polyurethane-addition polymer, comprising hybrid particles having a weight average mean diameter of less than 1000 nm comprised of:
   i) polyurethane polymer;
   ii) addition copolymer of ethylenically unsaturated copolymerisable monomers, where the polyurethane polymer of i) is the reaction product of:
      a) aromatic polyisocyanate that is essentially free of sterically hindered isocyanate moieties;
      b) aliphatic polyisocyanate, wherein the isocyanate functionality of the aromatic polyisocyanate is from 1.8 to 2.3 and the isocyanate functionality of the aliphatic polyisocyanate is up to 4;
      c) compound containing two hydroxyl moieties reactive with the isocyanate moieties of a) and b);
      d) compound containing at least one dispersing moiety and at least one moiety reactive with the isocyanate moieties of a) and b), wherein the ratio of the total number of isocyanate moieties from the aromatic polyisocyanate to the total number of the isocyanate reactive moieties of c) and d) is from 0.50 to 1.45; and
      e) chain extender compound.

2. An aqueous dispersion according to claim 1, characterized in that the isocyanate functionality of the aromatic polyisocyanate is from 1.9 to 2.1 and the isocyanate functionality of the aliphatic polyisocyanate is from 1.7 to 3.

3. An aqueous dispersion according to claim 1 characterised in that the hybrid polymer particles have a weight average mean diameter selected from those from 20 to 650 nm, or from 20 to 200 nm., or from 20 to 90 nm. as this produces transparent dispersions.

4. An aqueous dispersion according to claim 1 characterised in that the hybrid polymer particles have a weight average mean diameter in the range from 20 to 90 nm. to produce transparent dispersions.

5. An aqueous dispersion according to claim 1 characterised in that the hybrid polymer particles are of the core-shell type.

6. An aqueous coating composition comprising a dispersion according to claim 1.

7. An aqueous coating composition according to claim 5 characterised in that the composition also contains ingredients selected from the group comprising pigments, fillers, waxes, extenders, rheological modifiers, dispersants, anti-foams, tackifiers, plasticisers, crosslinking agents, flow aids, biocides, and combinations of any two or more of these.

8. A method of applying an aqueous coating composition to a substrate by brush, roller, blade or spray equipment characterized in that the composition is according to claim 5.

9. An aqueous coating composition according to claim 5 characterised in that the coating is selected from paints suitable for painting wood, floors, ceilings, metal, beverage and food containers; plastics, masonry, walls as a primer, undercoat, topcoat, lacquer, varnish, woodstain, or ink.

10. Process for making the aqueous coating composition of claim 5, comprising combining with the aqueous dispersion of Polyurethane-addition polymer hybrid particles at least one ingredient selected from pigments, fillers, waxes, extenders, rheological modifiers, dispersants, anti-foams, tackifiers, plasticisers, crosslinking agents, flow aids, biocides, and combinations of any two or more of these.

11. A process of making the aqueous dispersion of polyurethane-addition polymer hybrid particles of claim 1, comprising the steps of:
   a) reacting at an elevated temperature the compound containing two hydroxyl moieties with a molar excess of isocyanate moieties provided by a mixture of the aromatic polyisocyanate and aliphatic polyisocyanate, where the aromatic polyisocyanate is essentially free of sterically hindered isocyanate moieties;
   b) reacting some of the excess isocyanate moieties of the reaction product of a) with a compound containing at least one ionisable group and at least one moiety reactive with the isocyanate moieties to form a dispersible ionisable urethane prepolymer;

c) forming a solution of the ionisable polyurethane prepolymer in the ethylenically unsaturated monomers and dispersing the solution in water in the presence of a neutralizing agent to form an emulsion;

d) causing the molecular weight of the prepolymer to increase by reacting it with the chain extender compound; and e) causing the ethylenically unsaturated monomers to copolymerize.

12. An aqueous dispersion of polyurethane-addition polymer, comprising hybrid particles having a weight average mean diameter of less than 1000 nm and comprising:

i) polyurethane polymer;

ii) addition copolymer of ethylenically unsaturated copolymerisable monomers, where the polyurethane polymer of i) is the reaction product of:

a) aromatic polyisocyanate that is essentially free of sterically hindered isocyanate moieties;

b) aliphatic polyisocyanate, whereby the ratio on a molar basis of the aromatic polyisocyanate to the aliphatic polyisocyanate ranges from 10:90 to 90:10;

c) compound containing two hydroxyl moieties reactive with the isocyanate moieties of a) and b);

d) compound containing at least one dispersing moiety and at least one moiety reactive with the isocyanate moieties of a) and b), wherein the ratio of the total number of isocyanate moieties from the aromatic polyisocyanate to the total number of the isocyanate reactive moieties of c) and d) is from 0.50 to 1.45; and e) chain extender compound.

13. An aqueous dispersion according to claim 12 characterised in that the dispersing moiety is non-ionisable.

14. An aqueous dispersion according to claim 12 characterised in that the dispersing moiety is ionisable.

15. An aqueous dispersion according to claim 12, characterized in that the ratio of the total number of isocyanate moieties from the aromatic polyisocyanate to the total number of the isocyanate reactive moieties of c) and c) is from 0.5 to 1.3.

16. An aqueous dispersion according to claim 12, characterized in that the ratio of the total number of isocyanate moieties from the aromatic polyisocyanate to the total number of the isocyanate reactive moieties of c) and d) is from 0.8 to 1.25.

17. An aqueous dispersion according to claim 12, characterized in that the aromatic polyisocyanate has only a hydrogen atom on each of the aromatic ring carbons adjacent the aromatic ring carbons carrying an isocyanate moiety; and/or a fused aromatic ring adjacent to the aromatic ring carbons carrying an isocyanate moiety.

18. An aqueous dispersion according to claim 12 characterised in that the aromatic polyisocyanate is selected from the group comprising 4,4' methane diphenyl diisocyanate, para-phenylene diisocyanate, carbodiimide modified methane diphenyl diisocyanate and 1,5 naphthalene diisocyanate.

19. An aqueous dispersion according to claim 12, characterized in that the aromatic polyisocyanate is 4,4' methane diphenyl diisocyanate.

20. An aqueous dispersion according to claim 12, characterized in that the aliphatic polyisocyanate is 4,4' dicyclohexyl methane diisocyanate.

21. An aqueous dispersion according to claim 12, characterized in that the addition copolymer is derived from the esters of acrylic acid, methacrylic acid and optionally styrene and/or its derivatives.

22. An aqueous dispersion according to claim 12, characterized in that the ratio of polyurethane polymer to addition polymer is from 30:70 to 70:30.

23. An aqueous dispersion according to claim 12 characterised in that the hybrid polymer particles have a weight average mean diameter selected from those from 20 to 650 nm, or from 20 to 200 nm. or from 20 to 90 nm. as this produces transparent dispersions.

24. An aqueous dispersion according to claim 12 characterised in that the hybrid polymer particles have a weight average mean diameter in the range from 20 to 90 nm. to produce transparent dispersions.

25. An aqueous dispersion according to claim 12 characterised in that the hybrid polymer particles are of the core-shell type.

26. An aqueous coating composition comprising a dispersion according to claim 12.

* * * * *